US010108000B2

(12) United States Patent
Qian et al.

(10) Patent No.: US 10,108,000 B2
(45) Date of Patent: Oct. 23, 2018

(54) ADJUSTING DEVICE FOR AN ILLUMINATION COMPONENT OF A MICROSCOPE, A MICROSCOPE ILLUMINATION DEVICE AND A MICROSCOPE

(71) Applicant: Leica Microsystems Ltd. Shanghai, Shanghai (CN)

(72) Inventors: Chris Qian, Shanghai (CN); Gloria Dong, Shanghai (CN)

(73) Assignee: Leica Microsystems Ltd. Shanghai, Shanghai (CN)

( * ) Notice: Subject to any disclaimer, the term of this patent is extended or adjusted under 35 U.S.C. 154(b) by 240 days.

(21) Appl. No.: 14/706,373

(22) Filed: May 7, 2015

(65) Prior Publication Data

US 2015/0331227 A1   Nov. 19, 2015

(30) Foreign Application Priority Data

May 13, 2014  (CN) ..................... 2014 2 0242651 U

(51) Int. Cl.
   *G02B 21/24* (2006.01)
   *G02B 21/06* (2006.01)
   *G02B 21/00* (2006.01)

(52) U.S. Cl.
   CPC ............. *G02B 21/24* (2013.01); *G02B 21/06* (2013.01); *G02B 21/0088* (2013.01)

(58) Field of Classification Search
   CPC ................... G02B 21/24; G02B 21/06; G02B 21/00–21/368; G02B 25/00; G02B 25/001

USPC ................ 359/368–398, 643–647, 656–661
See application file for complete search history.

(56) References Cited

U.S. PATENT DOCUMENTS

| 2,977,848 | A  | * | 4/1961  | Malfeld ................. | G02B 21/00 353/39 |
| 6,661,589 | B2 | * | 12/2003 | Takanashi ............ | G02B 6/3526 359/694 |
| 7,903,327 | B2 | * | 3/2011  | Karaki ............... | G02B 21/0004 359/368 |
| 2013/0335820 | A1 | * | 12/2013 | Matsumoto .......... | G02B 21/086 359/390 |

(Continued)

FOREIGN PATENT DOCUMENTS

CN            2867371 Y        2/2007

*Primary Examiner* — Ricky Mack
*Assistant Examiner* — Kristina Deherrera
(74) *Attorney, Agent, or Firm* — Hodgson Russ LLP

(57) ABSTRACT

An adjusting device for an illumination component of a microscope, an illumination device and a microscope containing the adjusting device are disclosed. The adjusting device for an illumination component of a microscope includes a first barrel component having an axis; a second barrel component received in the first barrel component, the second barrel component having an axis coincident with or parallel to the axis of the first barrel component, wherein the second barrel component houses and supports the illumination component; and a plurality of set screws each having a first end coupled to a side wall of the first barrel component at a corresponding coupling point and a second end pressed against a side wall of the second barrel component. With embodiments of the present invention, the structure is simpler and the cost is lower.

15 Claims, 8 Drawing Sheets

(56) References Cited

U.S. PATENT DOCUMENTS

2015/0272353 A1\* 10/2015 Christodoulou ....... A47G 1/202
                                                         29/525.01

\* cited by examiner

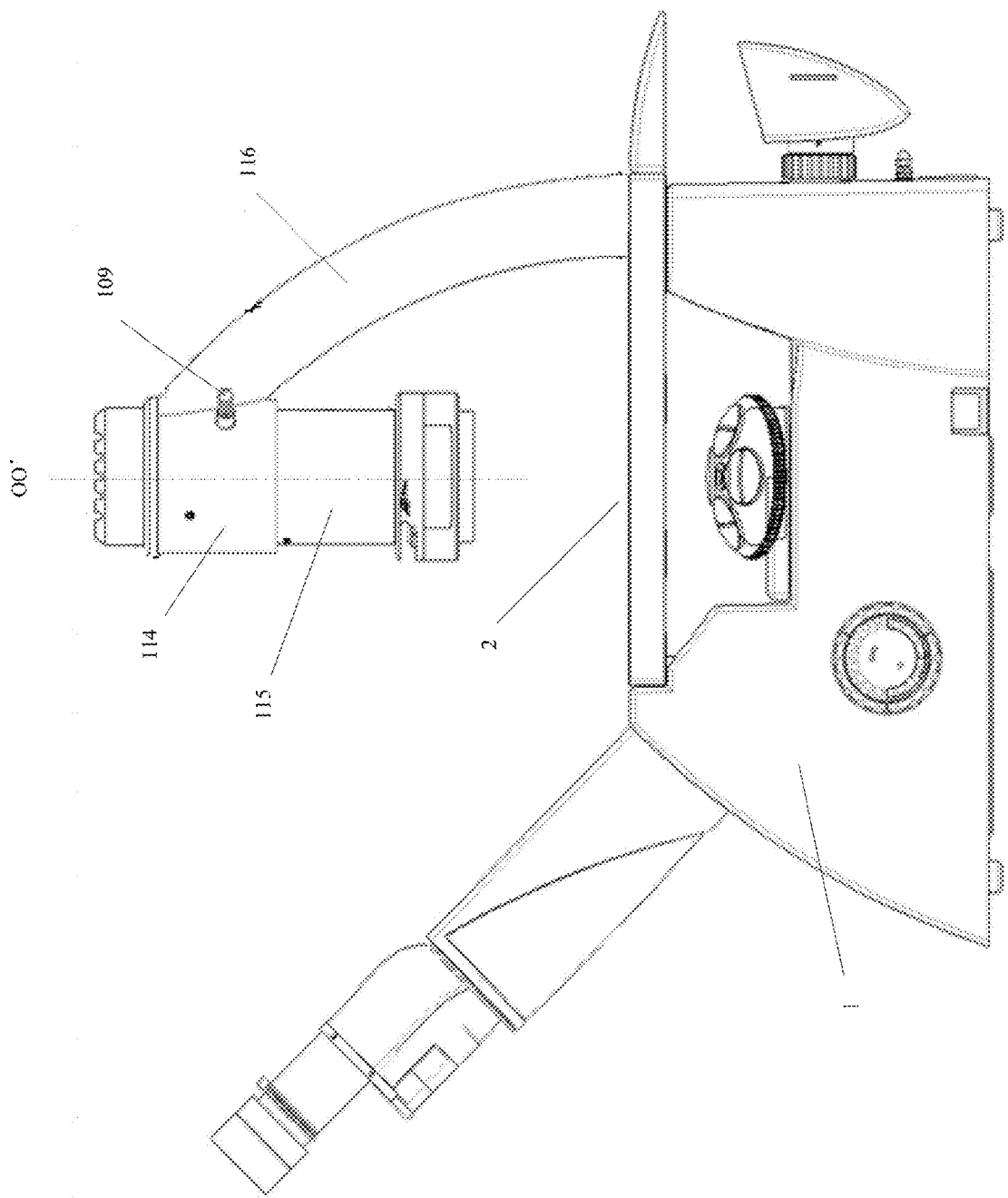

ADJUSTING DEVICE FOR AN ILLUMINATION COMPONENT OF A MICROSCOPE, A MICROSCOPE ILLUMINATION DEVICE AND A MICROSCOPE

CROSS-REFERENCE TO RELATED APPLICATIONS

This application claims priority of Chinese patent application number 201420242651.7 filed May 13, 2014, the entire disclosure of which is incorporated by reference herein.

TECHNICAL FIELD

The present invention relates to the field of microscopy, and more particularly to an adjusting device for an illumination component of a microscope, a microscope illumination device and a microscope containing the adjusting device.

BACKGROUND OF THE INVENTION

In general, a microscope includes an illumination component for illuminating the object to be observed placed on the table of the microscope, for example, a condenser. Generally, the illumination component can be adjusted through an adjusting device so as to condense the light to a desired position. Typically, the movement of the illumination component is achieved using a rack structure. But the rack structure occupies a larger space, and imposes a high requirement on the attachment face, thereby resulting in a higher cost.

SUMMARY OF THE INVENTION

The present invention provides a simpler, more cost-effective adjusting device for an illumination component of a microscope, an microscope illumination device and a microscope containing the adjusting device.

According to an aspect of the present invention, an adjusting device for an illumination component of a microscope is provided, which includes:

a first barrel component having an axis;

a second barrel component received in the first barrel component, the second barrel component having an axis coincident with or parallel to the axis of the first barrel component, wherein the second barrel component houses and supports the illumination component; and a plurality of set screws each having a first end coupled to a side wall of first barrel component at a corresponding coupling point and a second end pressed against a side wall of the second barrel component.

According to one embodiment, the adjusting device further comprises a support arm, one end of which is secured to the first barrel component.

According to one embodiment, when in use, the illumination component is secured to the second barrel component and is contained in a space inside the second barrel component.

According to one embodiment, when in use, the other end of the support arm is secured to a main body of the microscope, such that the axes of the first and second barrel components are perpendicular to a surface of a table of the microscope.

According to one embodiment, when in use, a friction force between the second end of each of the plurality of set screws and the second barrel component is such that the second barrel component held at rest relative to the second barrel component, and can slide up and down relative to the first barrel component in a direction of said axis of the first barrel component, for example when an external force is applied thereto.

According to one embodiment, the second end of each set screw is made of material which provides friction and has resiliency.

According to one embodiment, the second end of each set screw is made of engineering plastics.

According to one embodiment, the second end of each set screw is made of nylon material.

According to one embodiment, the second end of each set screw is made of Teflon material.

According to one embodiment, the first end of each set screw is coupled to the side wall of the first barrel component through a threaded hole in the side wall of first barrel component.

According to one embodiment, the plurality of set screws includes a first set screw and a second set screw, wherein a line connecting between the coupling point of the first set screw and the coupling point of the second set screw passes through the axis of the first barrel component and is perpendicular to such axis.

According to one embodiment, the plurality of set screws includes a first set screw, a second set screw and a third set screw, wherein respective coupling points of the first, second and third set screws are angularly spaced apart from one another about the axis of the first barrel component by an equal angular interval and are located in a plane perpendicular to the axis of the first barrel component.

According to one embodiment, the plurality of set screws further includes a fourth set screw, wherein a line connecting between the coupling point of the fourth set screw and the coupling point of one of the first, second and third set screws is parallel to the axis of the first barrel component.

According to one embodiment, respective coupling points of the first, second and third set screws are located in an upper part of the side wall of the first barrel component, and the coupling point of the fourth set screw with the side wall of the first barrel component is located in a lower part of the side wall of first barrel component.

According to one embodiment, the plurality of set screws further comprises a fifth set screw and a sixth set screw, wherein a line connecting between the coupling points of the first and the fourth set screws, a line connecting between the coupling points of the second and the fifth set screws, and a line connecting between the coupling points of the third and the sixth set screws are all parallel to the axis of the first barrel component.

According to one embodiment, the respective coupling points of the first, second and third set screws are located in an upper part of the side wall of first barrel component, and the respective coupling points of the fourth, fifth and sixth set screws are located in a lower part of the side wall of the first barrel component.

According to one embodiment, the adjusting device further comprises a first set rod and a second set rod, wherein length directions of both the first and second set rods are parallel to the axis of the first barrel component and are aligned respectively with the coupling points of two of the first, second and third set screws.

According to one embodiment, the respective coupling points of the first, second and third set screws are located in an upper part of the side wall of the first barrel component, the coupling point of the fourth set screw is located in a lower part of the side wall of first barrel component, and the first and second set rods are located in the lower part of the side wall of the first barrel component.

According to one embodiment, the side wall of the second barrel component has a bar groove which extends parallel to the axis of the second barrel component, and the adjusting device further comprises at least one anti-rotation screw having a first end coupled to the side wall of the first barrel component and a second end is received in and pressed against the bar groove and can slide along the bar groove.

According to one embodiment, the side wall of the second barrel component has a bar groove which extends parallel to the axis of the second barrel component, and the second end of at least one of the plurality of set screws is received in and pressed against the bar groove and can slide along the bar groove.

According to one embodiment, the first end of at least one of the plurality of set screws has a head which protrudes from the side wall of the first barrel component to facilitate manual adjustment.

According to one embodiment, the side wall of the second barrel component includes a bar groove which extends parallel to the axis of the second barrel component, the bar groove has at least one stop hole therein, and the adjusting device further comprises a stop component having a first end coupled to side wall of the first barrel component and a second end received in and pressed against the bar groove, wherein the second end of the stop component can slide along the bar groove and be stopped in the at least one stop hole.

According to one embodiment, the stop component includes a secure screw, a spring and a steel ball, wherein a first end of the secure screw is coupled to the side wall of the first barrel component, the spring is coupled to the secure screw, and the spring is arranged to bias the ball into the at least one stop hole.

According to another aspect of the present invention, an illumination device for a microscope is provided, said illumination device includes:

an adjusting device as mentioned above; and an illumination component, which is secured to the second barrel component of said adjusting device and is contained in a space inside the second barrel component.

According to another aspect of the present invention, a microscope including the illumination device as mentioned above is provided.

With the adjusting device, the illumination device or the microscope including the adjusting device according to embodiments of the present invention, due to elimination of gear and rack parts of a traditional adjusting device, the structure of the present invention is simpler, more convenient to machine, and eliminates the requirement on the attachment face, thereby needing less space and lower cost. In addition, since a nylon head is utilized by the set screws as a friction means in some embodiments, the risk of the outside wall of the barrel component being scratched is reduced. Furthermore, in some embodiments, the adjusting device may comprise a support arm one end of which when in use is secured to the first barrel component and the other end is secured to the main body of a microscope to support the adjusting device, therefore the adjusting device integrates two functions of supporting the illumination component and moving the condenser.

BRIEF DESCRIPTION OF THE DRAWING VIEWS

FIG. 1 is an overview of a microscope incorporating an adjusting device according to one embodiments of the present invention.

FIG. 6 is a cross-sectional view taken generally along line 6-6 in FIG. 4a.

DETAILED DESCRIPTION OF THE INVENTION

Figure 2A:
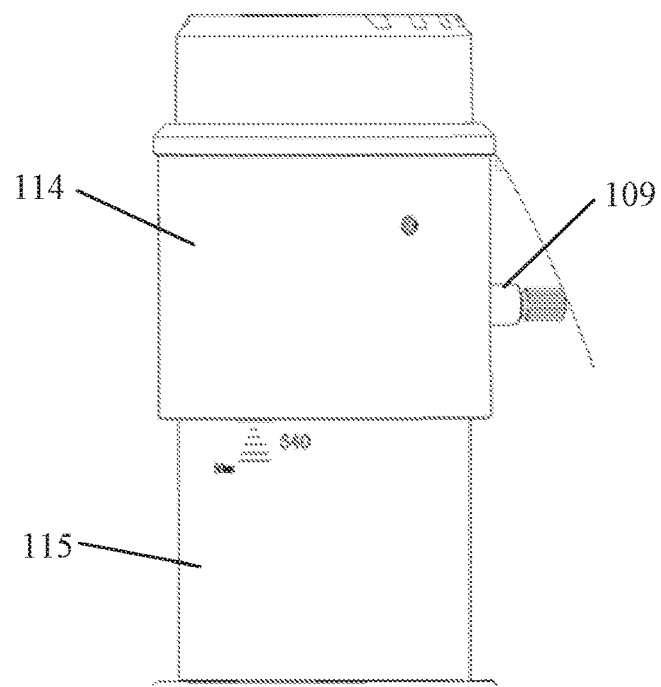
FIGS. 2a and 2b are schematic views respectively of the adjusting device in different adjusting states according to embodiments of the present invention.
Figure 2B:
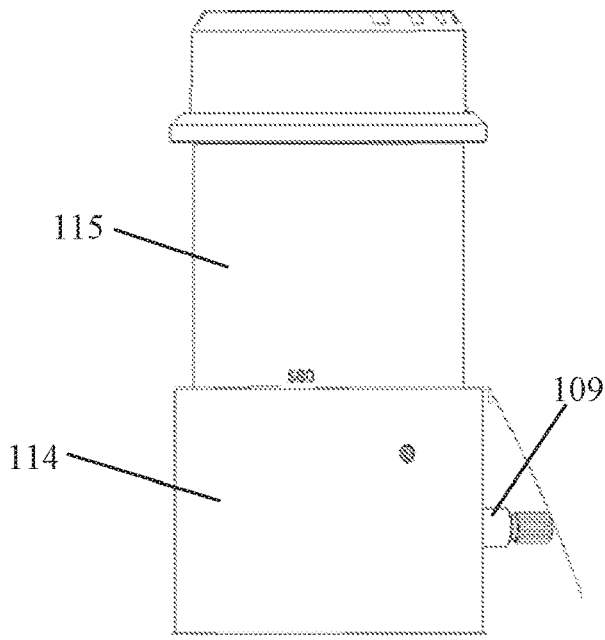
Figure 3:
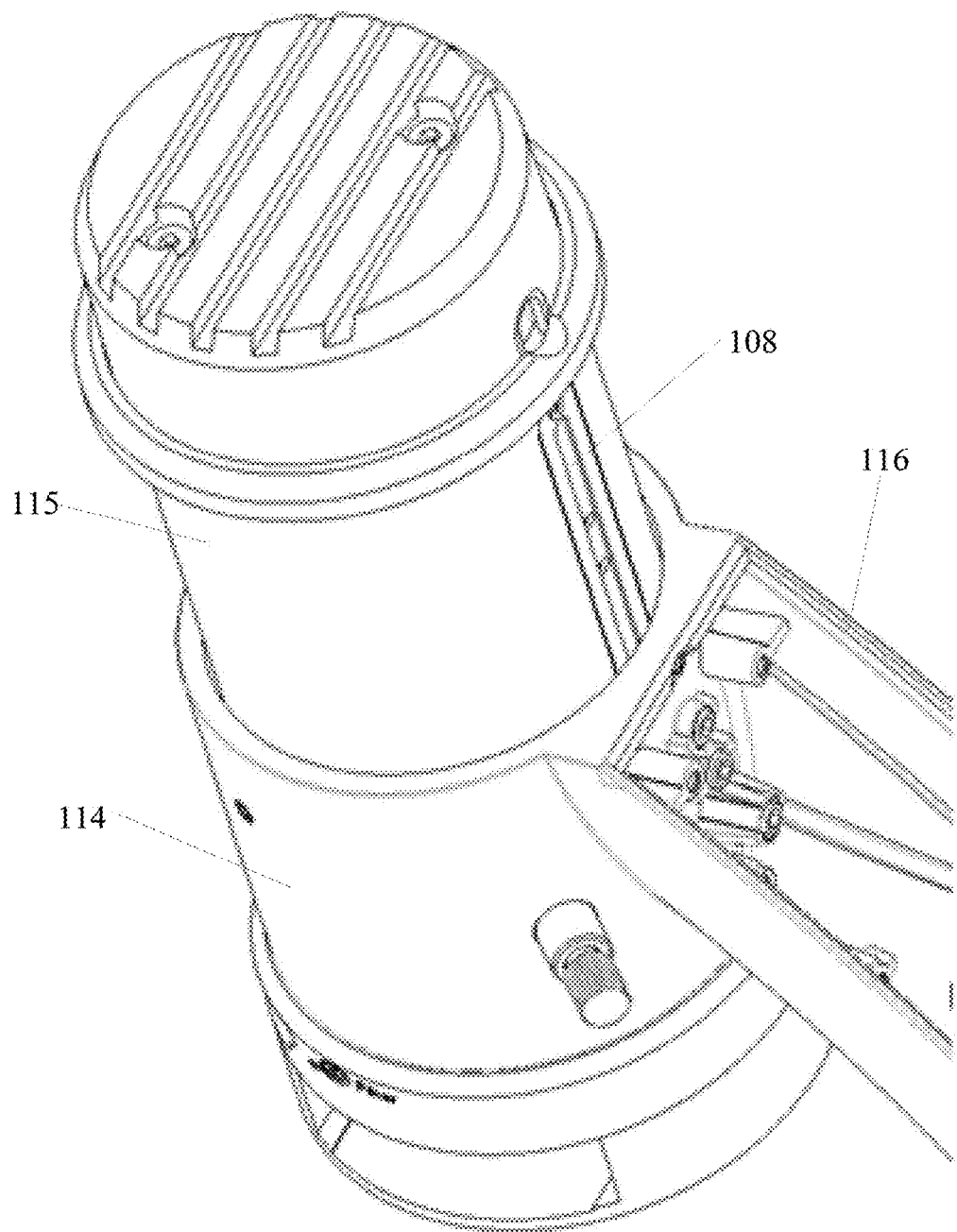
FIG. 3 is an enlarged elevation view of the adjusting device according to embodiments of the present invention, wherein a part of the side wall of the support arm is removed, thereby exposing the structure inside.
Figure 4A:
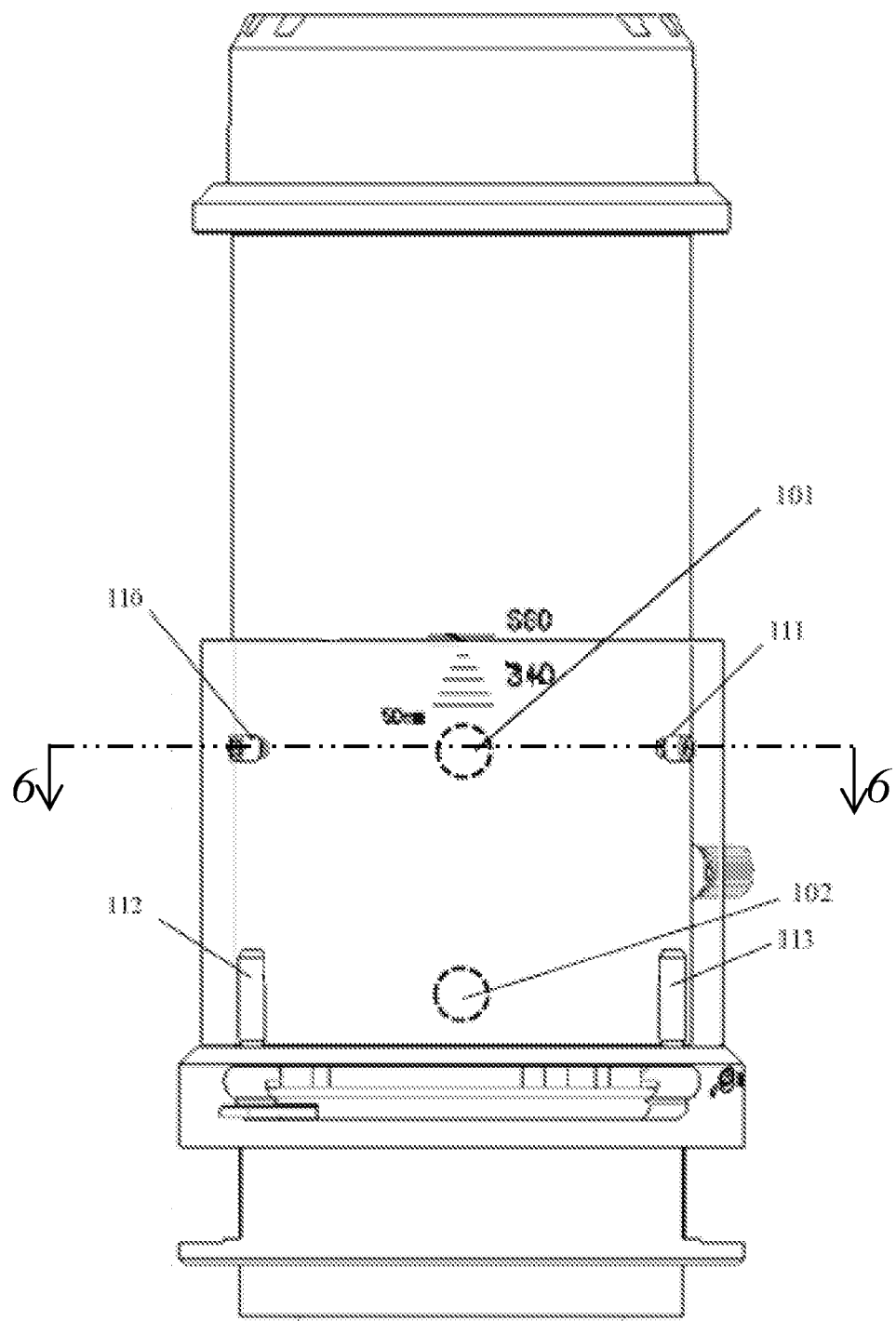
FIGS. 4a and 4b are side and front perspective views.
Figure 4B:
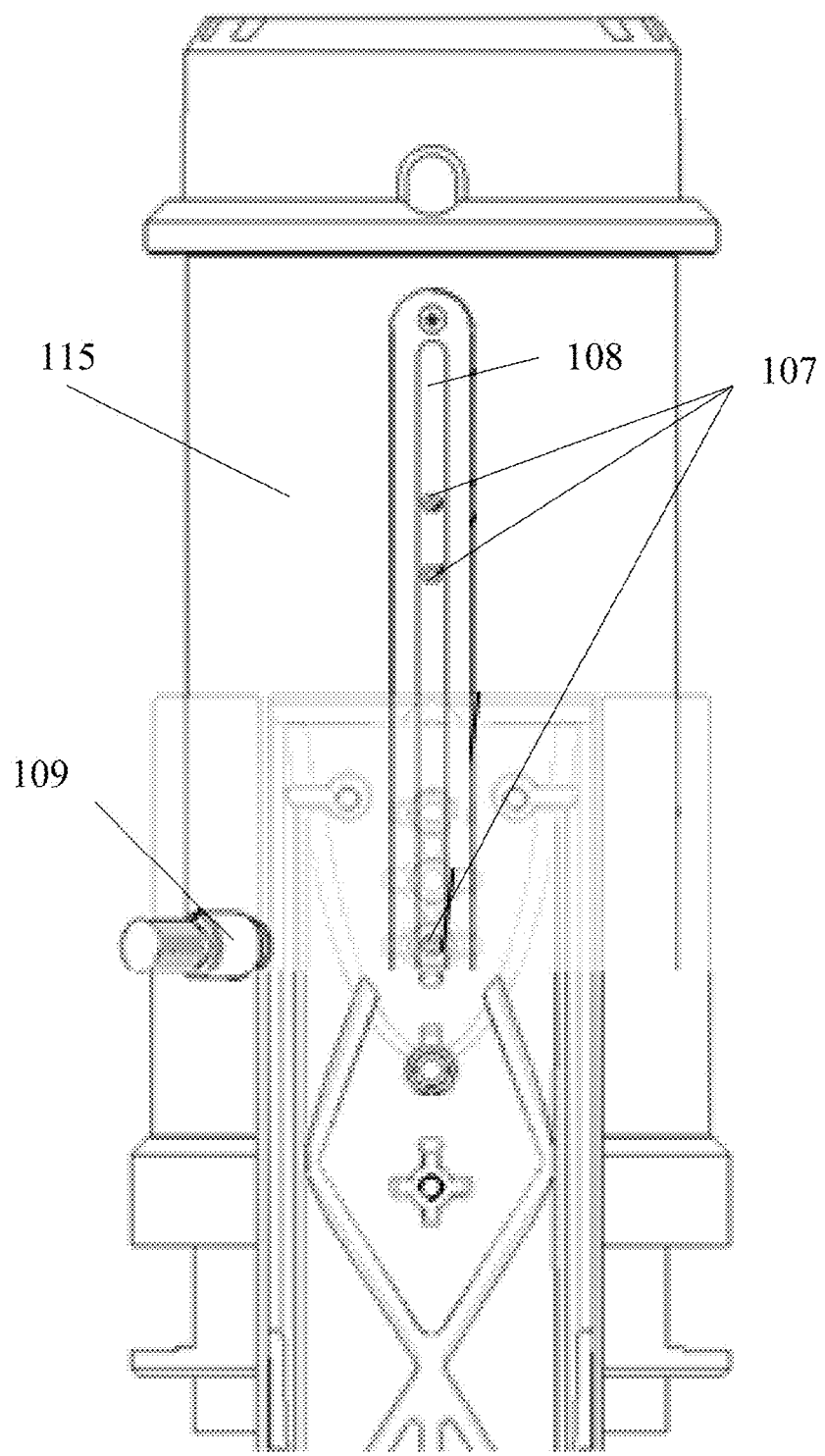
Figure 4C:
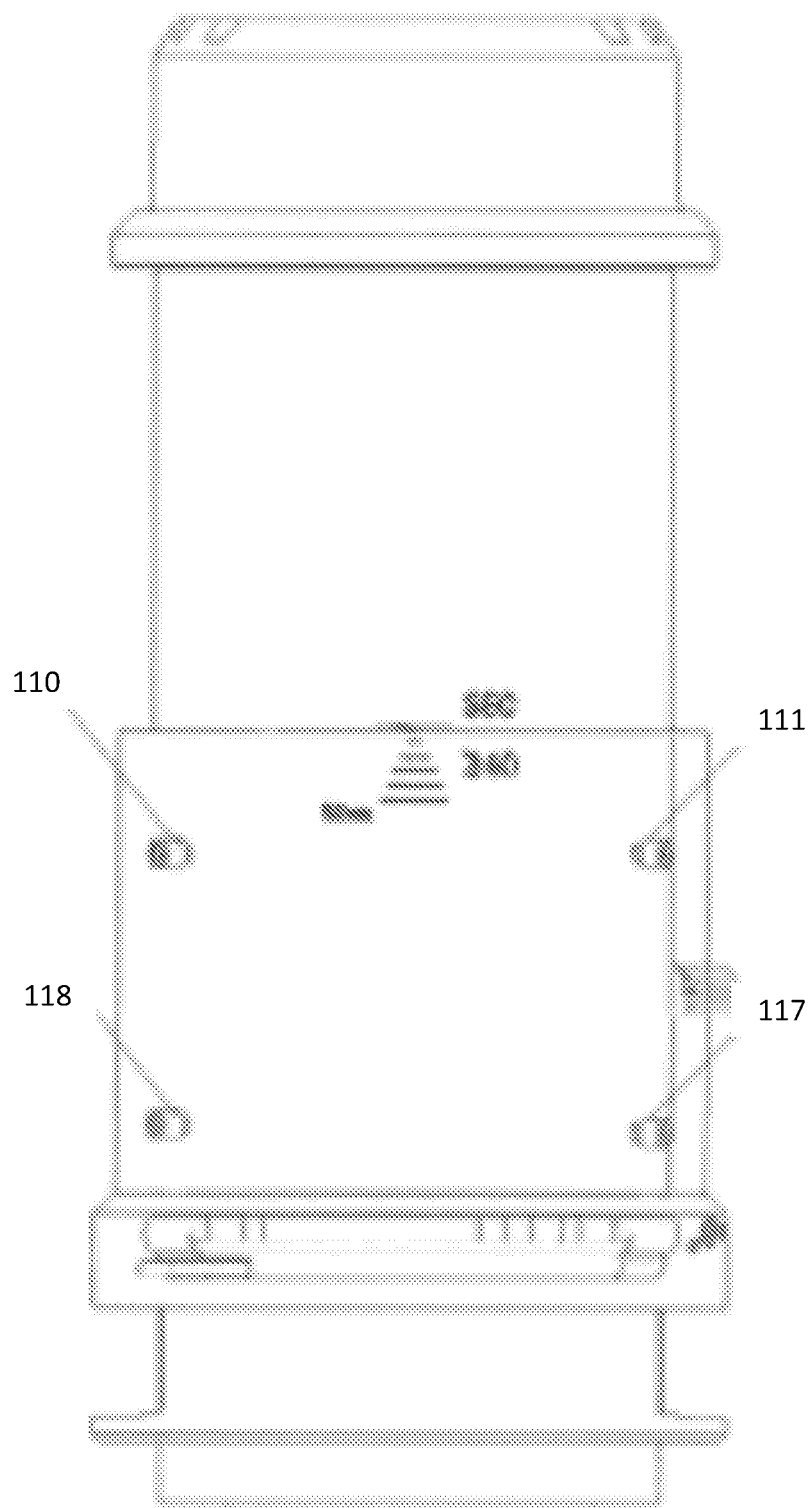
FIG. 4c is a side perspective view, of the adjusting device according to embodiments of the present invention.
Figure 5:
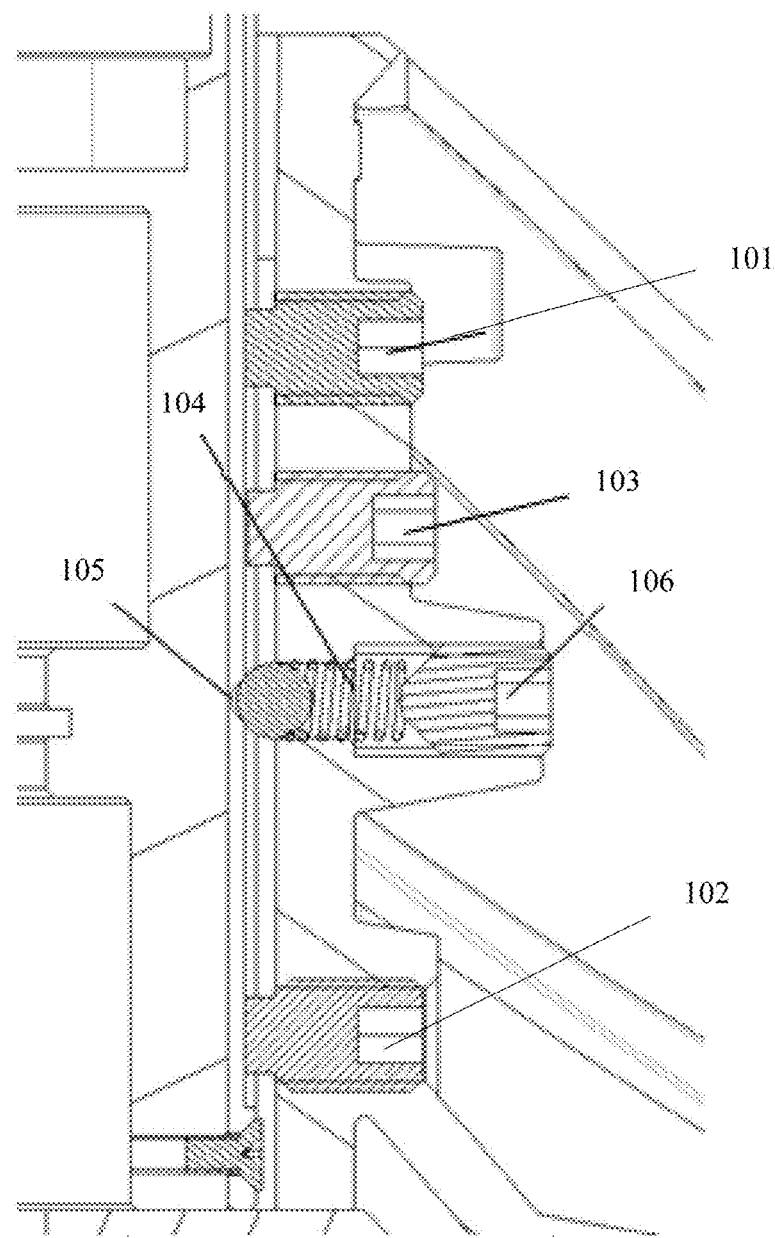
FIG. 5 is a cross-sectional view taken along the bar groove of the adjusting device according to embodiments of the present invention.

FIG. 1 shows a microscope including an illumination component contained in an adjusting device. FIG. 1 shows two constituent parts of the adjusting device: a first barrel component 114 and a second barrel component 115. Wherein, the second barrel component 115 for housing and supporting the illumination component is encased in the first barrel component, and their respective axes coincide with or are parallel to each other. In respective embodiments of FIG. 1 and the following, for the sake of brief, the axes OO' of the first barrel component 114 and the second barrel component 115 are described and shown as coinciding with each other. In use, the illumination component is secured to the second barrel component 115 and is contained in the space inside the second barrel component 115. Also shown in FIG. 1 is a support arm 116, one end of which is secured to the first barrel component 114, and when in use, the other end is secured to the main body 1 of the microscope, such that the axis OO' of the first barrel component 114 and the second barrel component 115 is perpendicular to the surface of the table 2 of the microscope. Although in the accompanying drawings the support arm 116 is shown as a curved streamline shape, it may be understood that the support arm 116 can take any other suitable shapes. In the following description, although the adjusting device and the support arm 116 are described as separate parts, in some other embodiments, the adjusting device includes the support arm 116, and the first barrel component 114 of the adjusting device is formed integrally with the support arm together. Also shown in FIG. 1 is a screw 109 protruding from side wall of the first barrel component 115. In the following, the structure of the adjusting device according to the embodiments of the present invention will be described in detail in conjunction with FIGS. 1-5.

In one embodiment, in addition to the first barrel component 114 and the second barrel component 115, the adjusting device also comprises a plurality of set screws, one end of each of which is coupled to a side wall of the first barrel component 114, and the other end is pressed against the a side wall of the second barrel component 115. In one example, each set screw is coupled to the side wall of the first barrel component by being inserted into a threaded hole in the side wall of the first barrel component. The pressure generated due to the other end of the adjusting device abutting against the side wall of the second barrel component 115 can be adjusted by tightening or loosening the set screw in the threaded hole, thereby varying the friction force between the other end of the set screw and the side wall of the second barrel component 115. In one example, the other end of each set screw is made of material that can provide friction and has resiliency, for example engineering plastics, wherein appropriate engineering plastics includes for example nylon or Teflon material. When mounted on a microscope, by tightening or loosening the set screw, the friction force between the other end of the set screw and the side wall of the first barrel component 114 can be maintained at a proper degree, such that the second barrel component 115 is held at rest with respect to the first barrel component 114 and can slide in the direction of axis OO' along the side wall of the first barrel component 114 during the period of application of a proper external force. In this way, after being mounted on the microscope, the first barrel component 114 and the second barrel component 115 are maintained in a relative rest if there is no need to adjust the illumination component, and an upward or downward force can be exerted on the second barrel component 115 when there is a need to adjust the illumination component to cause the second barrel component 115 to slide up and down relative to the first barrel component 114 in the direction of axis OO'.

In one example, the plurality set screws included two set screws: a first set screw and a second set screw, wherein a line connecting between a coupling point of the first set screw at which its one end is coupled to the side wall of the first barrel component and a coupling point of the second set screw at which its one end is coupled to the side wall of the first barrel component passes through the axis of the first barrel component and is perpendicular to the axis. The first barrel component and the second barrel component remain at rest relative to one another under the action of the two set screws where there is no external force, and during the period when an upward or downward force is applied to the second barrel component 115, the second barrel component 115 can slide up and down relative to the first barrel component 114 in the direction of axis OO'.

Figure 6:
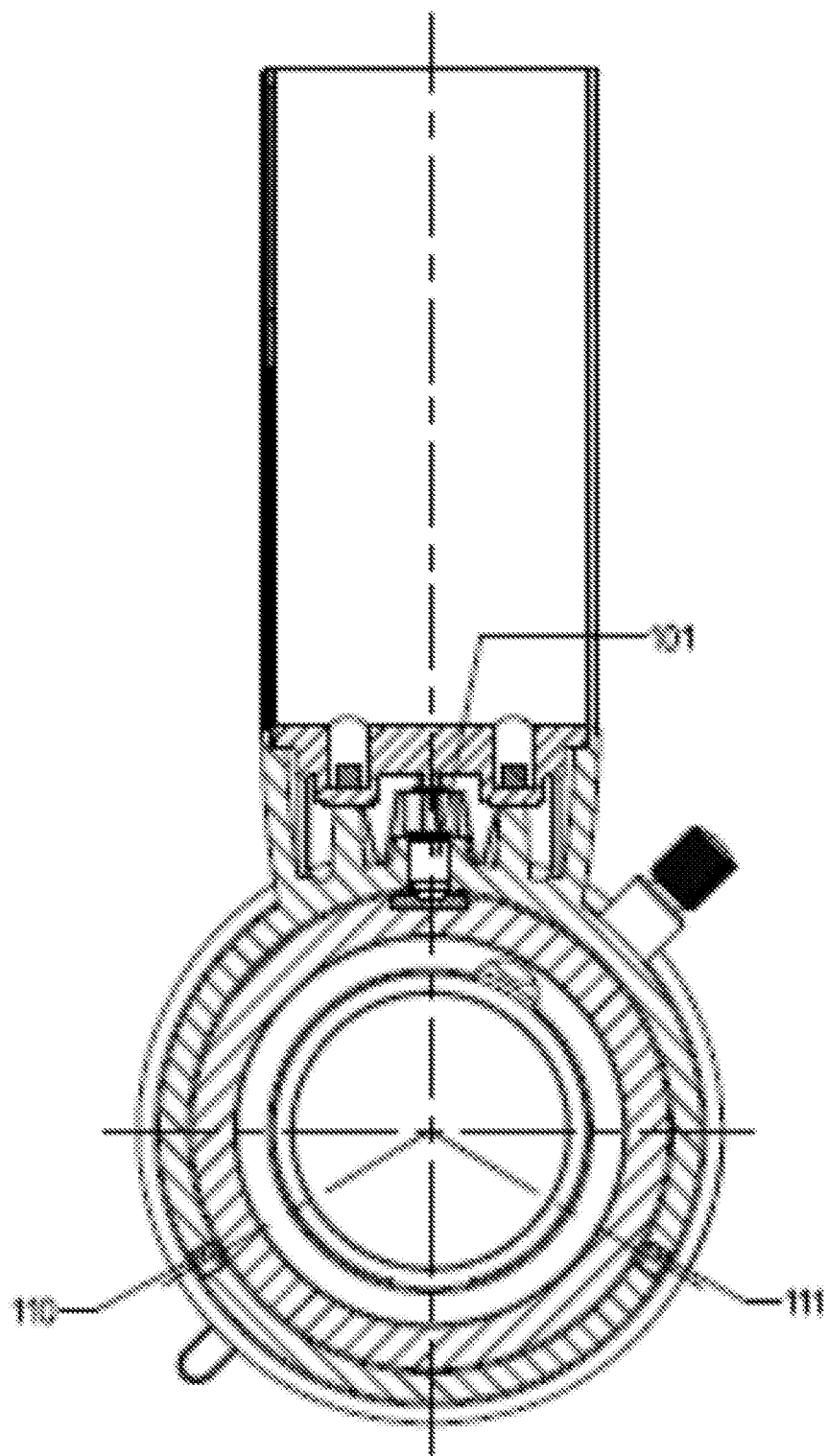

Another example is shown in FIGS. 2-6. In the example, the plurality of set screws includes a first set screw 101, a second set screw 110 and a third set screw 111, respective coupling points of which with the side wall of the first barrel component 114 are spaced apart by an equal angular interval about axis OO' as shown in FIG. 6 and are located in a plane that is perpendicular to the axis OO'.

Optionally, as shown in FIGS. 2-5, the plurality of set screws further comprises a fourth set screw 102, the coupling point of which with the side wall of the first barrel component 114 and the coupling point of the first set screw 101 with the side wall of the first barrel component 114 are aligned with each other in the direction of axis LL', namely the line connecting between the coupling point of the fourth set screw 102 with the side wall of the first barrel component 114 and the coupling point of the first set screw 101 with the side wall of the first barrel component 114 is parallel to the axis OO'. Optionally, respective coupling points of the first set screw 101, the second set screw 110 and the third set screw 111 with the side wall of the first barrel component are located in an upper part of the side wall of the first barrel component 114, and the coupling point of the fourth set screw 102 with the side wall of the first barrel component 114 is located in a lower part of the side wall of the first barrel component 114.

Optionally, as shown in FIGS. 2-5, in addition to the aforesaid set screws, the adjusting device further comprises a first set rod 112 and a second set rod 113 which are coupled to the first barrel component 114 and pressed against the side wall of the second barrel component 115, the length direction of each set rod being parallel to the axis OO' and aligned respectively with the coupling points of the second set screw 110 and the third set screw 111 with the side wall of the first barrel component 114. In one example, the first set rod 112 and the second set rod 112 are inserted into respective slots located at the bottom of the first barrel component 114. It is understood that the first set rod 112 and the second set rod 113 can be coupled to the first barrel component 114 in any other proper manners. Optionally, each set rod is made of material which can provide a friction and has resiliency, for example engineering plastics, wherein appropriate engineering plastics include for example nylon or Teflon material. When the second barrel component 115 slides up and down relative to the first barrel component 114, the first set rod 112 and the second set rod 114 parallel to the axis OO' can provide a friction moment which prevents the rotation of the second barrel component 115 about the axis OO'. Furthermore, the rotation or inclination of the second barrel component 115 can be prevented by the alignment of the fourth set screw 102, the first set rod 112 and the second set rod 114 with the first set screw 101, the second set screw 110 and the third set screw 111, respectively.

Optionally, the first set rod 112 and the second set rod 113 can be replaced by two set screws, and one end of each of which is coupled to the side wall of the first barrel component 114 and the other end is pressed against the side wall of the second barrel component 115. Similarly, the other end of each set screw may be made of material that can provide a friction and has resiliency, for example engineering plastics, wherein appropriate engineering plastics includes for example nylon or Teflon material. Optionally, these two set screws are located in a same plane as the fourth set screw 102 and respectively aligned with the first set screw 101, the second set screw 110 and the third set screw 111 in the direction of the axis OO'.

Optionally, as shown in FIGS. 2-5, there is a bar groove 108 parallel to the axis OO' on the side wall of the second barrel component 115. In one example, the other end of at least one set screw of the plurality of set screws above mentioned are pressed against in the bar groove 108 and can slide up and down along the bar groove 108. Such a structure can also prevent the rotation of the second barrel component 115. Alternatively, at least one anti-rotation screw 103 can be included additionally, one end of which is coupled to the side wall of the first barrel component 114, and the other end is pressed against in the bar groove 108 and can slide up and down along the bar groove 108. Optionally, at least one of the above mentioned set screws and/or anti-rotation screw 103 can be made of material that can provide a friction and has resiliency, for example engineering plastics, wherein appropriate engineering plastics includes for example nylon or Teflon material. Optionally, the coupling point of the anti-rotation screw with the first barrel component 114 is located in a upper part of the side wall of the first barrel component 114.

Optionally, as shown in FIGS. 2-5, the adjusting device can also include an adjusting screw 109, one end of which is coupled to the side wall of the first barrel component 114 and the other end is pressed against the side wall of the second barrel component 115. Where, as shown in the figure, the head of one end of the adjusting screw 109 protrudes from the side wall of the first barrel component 114 for pinching by the fingers of the operator to rotate in or out the adjusting screw 109. By rotating in or out the adjusting screw 109, the pressure with which it abuts against the second barrel component 115 can be adjusted, thereby adjusting the friction force between its other end and the side wall of the second barrel component 115. In one example, where the adjusting screw 109 is tightened properly, even in the presence of external force up-wards or down-wards, the second barrel component 115 will not slide readily relative to the first barrel component 114; and when the illumination component needs to be adjusted up and down, the adjusting screw 109 can be unscrew, such that the second barrel component 115 can slide up and down relative to the first barrel component 114 under a force upwards or downwards. In one example, the end of the adjusting screw 109 abutting against the second barrel component 115 is made of rigid material. In another example, the end of the adjusting screw 109 abutting against the second barrel component 115 is made of material that can provides a friction and has resiliency, for example engineering plastics, wherein appropriate engineering plastics includes for example nylon or Teflon material.

Optionally, as shown in FIGS. 2-5, there is at least one, for example three, stop holes 107 in the bar groove 108. Optionally, the adjusting device further comprises a stop component, one end of which is coupled to the side wall of the first barrel component 114, and the other end is pressed against in the bar groove 108 and can slide up and down along the bar groove 108 and be located in the stop holes 107. In the example as shown in the figure, the stop component comprises a secure screw 106, a spring 104 and a steel ball 105, wherein one end of the secure screw 106 is coupled to the side wall of the first barrel component 114, the spring is fitted over the secure screw 106, one end of the spring is coupled to the secure screw 106 and the other end is pressed against the steel balls 105. It may be understood that the stop component can be achieved in any other proper manners.

In some of the embodiments and figures above, although the adjusting device is described or shown as including each component mentioned above, it can be understood that these components are not essential to implement the present invention, and the adjusting device according to the present invention can contain fewer or more elements.

It shall be understood that the example embodiments described herein can be used separately or in any suitable combination thereof. It shall be understood that the foregoing description explains merely aspects of the disclosed embodiments. Various replacements and modifications can be made by the skilled in the art without departing from the aspects of the disclosed embodiments. Accordingly, the aspects of the disclosed embodiments are intended to encompass all such replacement, modification and alteration falling in the range of the appended claims.

LIST OF REFERENCES

101 First set screw
102 Fourth set screw
103 Anti-rotation screw
104 Spring
105 Steel ball
106 Secure screw
107 Stop hole
108 Bar groove
109 Adjusting screw
110 Second set screw
111 Third set screw
112 First nylon rod
113 Second nylon rod
114 First barrel component
115 Second barrel component
116 Support arm

What is claimed is:

1. An adjusting device for an illumination component of a microscope, the adjusting device comprising:
a first barrel component having an axis;
a second barrel component received in the first barrel component, the second barrel component having an axis coincident with or parallel to the axis of the first barrel component, wherein the second barrel component houses and supports the illumination component;
a plurality of set screws each having a first end coupled to a side wall of the first barrel component at a corresponding coupling point and a second end pressed against a side wall of the second barrel component; and
a support arm including a first end fixed to the first barrel component, wherein the first barrel component is integrally formed with the support arm, wherein the support arm is adapted to be secured to a main body of the microscope such that the axes of the first and second barrel components are perpendicular to a surface of a table of the microscope;
wherein the plurality of set screws includes a first set screw, a second set screw and a third set screw, wherein the respective coupling points of the first, second and third set screws are angularly spaced apart from one another about the axis of the first barrel component by an equal angular interval and are located in a plane perpendicular to the axis of the first barrel component;
wherein the plurality of set screws further includes a fourth set screw, and a line connecting the coupling point of the fourth set screw to the coupling point of one of the first, second and third set screws is parallel to the axis of the first barrel component; and
wherein the respective coupling points of the first, second and third set screws are located in a upper part of the side wall of the first barrel component, and the coupling point of the fourth set screw with the side wall of the first barrel component is located in a lower part of the side wall of first barrel component.

2. The adjusting device according to claim 1, wherein a friction force between the second ends of the plurality of set screws and the second barrel component holds the second barrel component stationary relative to the first barrel component, and wherein the second barrel component is slidably movable in a axial direction relative to the first barrel component by applying force to the second barrel component.

3. The adjusting device according to claim 1, wherein each of the plurality of set screws is coupled to the side wall of the first barrel component though a threaded hole in the side wall of the first barrel component.

4. The adjusting device according to claim 1, wherein the plurality of set screws includes a first set screw and a second set screw, wherein a line connecting the coupling point of the first set screw to the coupling point of the second set screw passes through the axis of the first barrel component and is perpendicular to the axis of the first barrel component.

5. The adjusting device according to claim 1, wherein the plurality of set screws further includes a fifth set screw and a sixth set screw, wherein a line connecting the respective coupling points of the first and the fourth set screws, a line connecting the respective coupling points of the second and the fifth set screws, and a line connecting the respective coupling points of the third and the sixth set screws are all parallel to the axis of the first barrel component.

6. The adjusting device according to claim 5, wherein the respective coupling points of the first, second and third set screws are located in a upper part of the side wall of first barrel component, and the respective coupling points of the fourth, fifth and sixth set screws are located in a lower part of the side wall of the first barrel component.

7. The adjusting device according to claim 1, further comprising a first set rod and a second set rod, each of the first and second set rods being elongated in a direction parallel to the axis of the first barrel component and aligned respectively with the coupling points of the other two of the first, second and third set screws.

8. The adjusting device according to claim 7, wherein the respective coupling points of the first, second and third set screws are located in an upper part of the side wall of the first barrel component, the coupling point of the fourth set screw is located in a lower part of the side wall of first barrel component, and the first and second set rods are located in the lower part of the side wall of the first barrel component.

9. The adjusting device according to claim 1, wherein the side wall of the second barrel component includes a bar groove extending parallel to the axis of the second barrel component, and the adjusting device further comprises at least one anti-rotation screw having a first end coupled to the side wall of the first barrel component and a second end received in and slidable along the bar groove.

10. The adjusting device according to claim 1, wherein the side wall of the second barrel component includes a bar groove extending parallel to the axis of the second barrel component, and the second end of at least one of the plurality of set screws is received in and slidable along the bar groove.

11. The adjusting device according to claim 1, wherein at least one of the plurality of set screws has a head at the first end thereof, the head protruding from the side wall of the first barrel component to facilitate manual adjustment of the at least one set screw.

12. The adjusting device according to claim 1, wherein the side wall of the second barrel component includes a bar groove extending parallel to the axis of the second barrel component, the bar groove having at least one stop hole therein, and the adjusting device further comprises a stop component having a first end coupled to the side wall of the first barrel component and a second end received in and slidable along the bar groove, wherein the second end of the stop component is biased to enter the at least one stop hole upon alignment therewith.

13. The adjusting device according to claim 12, wherein the stop component includes a secure screw, a spring and a ball, wherein the secure screw is coupled to the side wall of the first barrel component, the spring is coupled to the secure screw, and the spring is arranged to bias the ball.

14. An illumination device for a microscope, the illumination device comprising:
a first barrel component having an axis;
a second barrel component received in the first barrel component, the second barrel component having an axis coincident with or parallel to the axis of the first barrel component;
a plurality of set screws each having a first end coupled to a side wall of the first barrel component at a corresponding coupling point and a second end pressed against a side wall of the second barrel component, wherein the plurality of set screws includes a first set screw, a second set screw and a third set screw, wherein the respective coupling points of the first, second and third set screws are angularly spaced apart from one another about the axis of the first barrel component by an equal angular interval and are located in a plane perpendicular to the axis of the first barrel component, and wherein the plurality of set screws further includes a fourth set screw, and a line connecting the coupling point of the fourth set screw to the coupling point of one of the first, second and third set screws is parallel to the axis of the first barrel component, and wherein the respective coupling points of the first, second and third set screws are located in a upper part of the side wall of the first barrel component, and the coupling point of the fourth set screw with the side wall of the first barrel component is located in a lower part of the side wall of first barrel component;
a support arm including a first end fixed to the first barrel component, wherein the first barrel component is integrally formed with the support arm, wherein the support arm is adapted to be secured to a main body of the microscope such that the axes of the first and second barrel components are perpendicular to a surface of a table of the microscope; and
an illumination component housed and supported by the second barrel component.

15. A microscope comprising:
a main body;
a table including a surface for supporting an object to be viewed;
a support arm secured to the main body of the microscope;
a first barrel component having an axis, the first barrel component being fixed to an end of the support arm such that the axis of the first barrel component is perpendicular to the surface of the table, wherein the first barrel component is integrally formed with the support arm;
a second barrel component received in the first barrel component, the second barrel component having an axis coincident with or parallel to the axis of the first barrel component;
a plurality of set screws each having a first end coupled to a side wall of the first barrel component at a corresponding coupling point and a second end pressed against a side wall of the second barrel component, wherein the plurality of set screws includes a first set screw, a second set screw and a third set screw, wherein the respective coupling points of the first, second and third set screws are angularly spaced apart from one another about the axis of the first barrel component by an equal angular interval and are located in a plane perpendicular to the axis of the first barrel component, and wherein the plurality of set screws further includes a fourth set screw, and a line connecting the coupling point of the fourth set screw to the coupling point of one of the first, second and third set screws is parallel to the axis of the first barrel component, and wherein the respective coupling points of the first, second and third set screws are located in a upper art of the side wall of the first barrel component, and the coupling point of the fourth set screw with the side wall of the first barrel component is located in a lower part of the side wall of first barrel component; and
an illumination component housed and supported by the second barrel component;
wherein the support arm is secured to the main body of the microscope such that the axes of the first and second barrel components are perpendicular to the surface of the table of the microscope.

* * * * *